United States Patent
Vestergaard Frandsen et al.

(10) Patent No.: US 11,958,584 B2
(45) Date of Patent: Apr. 16, 2024

(54) GRAPHENE-OXIDE GRAFTED PBO (ZYLON®) FIBERS; METHOD FOR PRODUCTION AND APPLICATIONS TO AIRSHIP HULLS AND LIGHTER THAN AIR VEHICLES

(71) Applicant: SCEYE SA, Zug (CH)

(72) Inventors: Mikkel Vestergaard Frandsen, New York, NY (US); David Kim, Santa Fe, NM (US); Tobin Filleter, Toronto (CA); Sudeep Parambath Mundayodan, Hillsboro, OR (US)

(73) Assignee: SCEYE SA, Zug (CH)

( * ) Notice: Subject to any disclaimer, the term of this patent is extended or adjusted under 35 U.S.C. 154(b) by 553 days.

(21) Appl. No.: 17/297,023

(22) PCT Filed: Nov. 25, 2019

(86) PCT No.: PCT/EP2019/082458
§ 371 (c)(1),
(2) Date: May 26, 2021

(87) PCT Pub. No.: WO2020/109247
PCT Pub. Date: Jun. 4, 2020

(65) Prior Publication Data
US 2021/0394885 A1 Dec. 23, 2021

Related U.S. Application Data

(60) Provisional application No. 62/771,224, filed on Nov. 26, 2018.

(51) Int. Cl.
*B64B 1/58* (2006.01)
*C08J 7/04* (2020.01)
(Continued)

(52) U.S. Cl.
CPC .............. *B64B 1/58* (2013.01); *C08J 7/0427* (2020.01); *D06M 11/76* (2013.01); *D06M 15/41* (2013.01);
(Continued)

(58) Field of Classification Search
None
See application file for complete search history.

(56) References Cited

U.S. PATENT DOCUMENTS 9,598,165 B2   3/2017 Bullock
2012/0097194 A1*  4/2012 McDaniel .............. A01N 63/50
                                                435/197

FOREIGN PATENT DOCUMENTS

CL           61.549     4/2018
CN        102173145 A   9/2011
(Continued)

OTHER PUBLICATIONS

Effect of Graphine oxide coating on Natural Fiber composite (Year: 2019).*

(Continued)

*Primary Examiner* — Peter A Salamon
(74) *Attorney, Agent, or Firm* — Cermak Nakajima & McGowan LLP; James Creighton Wray

(57) ABSTRACT

In a method for producing a PBO fiber with increased resistance against UV-caused degradation, a coating is provided on the PBO fibers, wherein the coating comprises graphene oxide cross-linked by polymerization with glutaraldehyde and resorcinol. The fibers are useful for lighter than air vehicles.

7 Claims, 6 Drawing Sheets

(51) Int. Cl.
  *D06M 11/76* (2006.01)
  *D06M 15/41* (2006.01)
  *D06M 101/36* (2006.01)

(52) U.S. Cl.
  CPC ........ *C08J 2379/04* (2013.01); *C08J 2461/12* (2013.01); *D06M 2101/36* (2013.01)

(56) References Cited

FOREIGN PATENT DOCUMENTS

| | | |
|---|---|---|
| CN | 103014901 A | 4/2013 |
| CN | 103820996 A | 5/2014 |
| CN | 105088793 A | 11/2015 |
| CN | 106087396 A | 11/2016 |
| CN | 107794749 A | 3/2018 |
| EP | 2719719 A1 | 4/2014 |
| KR | 20150049403 A * | 5/2015 |
| KR | 20150049403 A | 5/2015 |
| KR | 101734895 B1 | 5/2017 |
| WO | 2012170864 A2 | 12/2012 |
| WO | 2018077806 A1 | 5/2018 |
| WO | 2018111568 A2 | 6/2018 |

OTHER PUBLICATIONS

Grafting of silane and graphene oxide onto PBO fibers (Year: 2015).*

Sudepp, P. M., et al., "Covalently Interconnected Three-Dimensional Graphene Oxide Solids," ACS NANO. 2013;7(8):7034-3040.

Chen Lei et al.: "Facile method to prepare multifunctional PBO fibers: simultaneously enhanced interfacial properties and UV resistance" RSC Advances (2013), vol. 3(46), pp. 24664-24670. https://pubs.rsc.org/en/content/articlelanding/2013/ra/c3ra44876b.

Chen Lei et al.: "Hierarchical poly(p. phenylene benzobisoxazole)/graphene oxide reinforcement with multifunctional and biomimic middle layer" Composites, Part A: Applied Science and Manufacturing, (2016), vol. 88, pp. 123-130. https://www.reprintsdesk.com/landing/dl.aspx?o=6116663&r=590581006.

Parambath M. et al.: "Covalently Interconnected Three-Dimensional Graphene Oxide Solids", ACS NANO (2013), vol. 7, pp. 7034-7040 p. 1 "Synthesis of Poly-GO".

Maekawa and Yoshino, "Tear propagation of a High-performance Airship Envelope Material", Journal of Aircraft vol. 45, No. 5, Sep.-Oct. 2008. https://arc.aiaa.org/doi/10.2514/1.32264.

Zhai and Euler, Material Challenges for Lighter-Than-Air Systems in High Altitude Applications, The American Institute of Aeronautics and Astronautics as contribution of AIAA 5th Aviation, Technology, Integration, and Operations Conference (ATIO), Sep. 26-28, 2005, Arlington, Virginia.

Chen et al., "Grafting of silane and graphene oxide onto PBO fibers: Multifunctional interphase for fiber/polymer matrix composites with simultaneously improved interfacial and atomic oxygen resistant properties", Composites Science and Technology vol. 106, Jan. 16, 2015, pp. 32-38.

Toyobo's Technical Information brochure (Revised 2005.6), "Pro fiber ZYLON®", available on the Internet as http://www.toyobo-global.com/seihin/kc/pbo/zylon-p/bussei-p/technical.pdf.

* cited by examiner

GRAPHENE-OXIDE GRAFTED PBO (ZYLON®) FIBERS; METHOD FOR PRODUCTION AND APPLICATIONS TO AIRSHIP HULLS AND LIGHTER THAN AIR VEHICLES

This application claims the benefit of U.S. Provisional Application No. 62/771,224 filed Nov. 26, 2018 and PCT/EP2019/082458 filed Nov. 25, 2019, International Publication No. WO 2020/109247 A1, which are hereby incorporated by reference in their entirety as if fully set forth herein.

FIELD OF THE INVENTION

The present invention relates to graphene-oxide coating on PBO (Zylon®) fibers; a method for production of such coated fibers, PBO fibers with such coating, an airship hull with such fibers and a lighter than air vehicle with a hull containing such fibers,

BACKGROUND OF THE INVENTION

Zylon® is a trade name for a synthetic polymer material which is a thermoset liquid-crystalline polyoxazole. It was invented in the 1980s and is currently manufactured and marketed by Toyobo Corporation®. The Zylon® fibers are commonly referred to as PBO fibers due to the chemical name poly(p-phenylene-2,6-benzobisoxazole.

This material has remarkable strength relatively to the weight it has been proposed as material for airships, for example in the article "Tear propagation of a High-performance Airship Envelope Material" published by Maekawa and Yoshino in Journal of Aircraft Vol. 45, No. 5, September-October 2008. As reported in this article, the PBO was used in a laminate with PBO as the base fabric.

Apart from PBO's high specific strength as compared to other commercially available high performance fibers, it also has a high resistance to creep elongation and is therefore especially useful for fiber reinforcement in light-weight high-strength laminate material for airships. This is discussed by Zhai and Euler in the article "Material Challenges for Lighter-Than-Air Systems in High Altitude Applications" published by the American Institute of Aeronautics and Astronautics as contribution of AIAA 5th Aviation, Technology, Integration, and Operations Conference (ATIO), 26-28 Sep. 2005, Arlington, Virginia.

However, PBO is also known to be very susceptible to degradation by atomic oxygen and must therefore be protected when being exposed thereto when used as a material for high-altitude airships in the stratosphere. This is discussed in the the article "Grafting of silane and graphene oxide onto PBO fibers: Multifunctional interphase for fiber/polymer matrix composites with simultaneously improved interfacial and atomic oxygen resistant properties" published by Chen et al. in Composites Science and Technology Vol. 106, 16 Jan. 2015, pages 32-38 and found on the following Internet page http://www.sciencedirect.com/science/article/pii/S0266353814003832. In this article, APTMS was used for bridging between PBO fibers and a coating containing GO and silane. It reads that "PBO-APTMS-GO showed simultaneously remarkable enhancement in interfacial shear strength (IFSS) and AO erosion resistance.". These authors have also filed a Chinese patent application CN103820996, disclosing hydroxyl functional processing of the PBO fibers using treatment of the PBO fibers by lithium aluminum hydride-diethyl ether. Graphene nanoribbon coating on PBO is also disclosed in CN105908489.

Another disadvantage of PBO is rapid photo-degradation, not only by UV but also by visible light. The presence of moisture and oxygen has been found to accelerate the photo-degradation. In Toyobo's Technical Information brochure (Revised 2005.6) called "Pro fiber ZYLON®", available on the Internet as http://www.toyobo-global.com/seihin/kc/pbo/zylon-p/bussei-p/technical.pdf it reads that light resistance was evaluated using Xenon light weather ohmmeter. The material strength decreased sharply at the initial stage of exposure and was more than in comparative studies of Aramid fibers. The experimental result showed that the residual strength after 6 months exposure to daylight is about 35%, why it is concluded therein that PBO for outdoor use have to the protected by covering material.

For these reasons, despite the apparent advantages in terms of high strength and low creep, other challenges go along with this fiber material when used for stratospheric airships, where the light intensity is high and the environment chemically highly reactive. It would be desirable to provide a way to make the PBO more resistant against photo degradation and the reactive gases in the stratosphere in order to use it for the hull of a high altitude airship.

For airships, fluorinated graphene oxide has been proposed in U.S. Pat. No. 9,598,165 for increasing gas tightness, another aspect important for airships. Gas tightness is also of concern in EP2719219 concerning graphene coating of various thermoplastic fibers. However, despite giving advantages with respect to gas tightness and resistance against atomic oxygen, graphene oxide is reported in CN102173145B that it has good transparency, which does not make it a good candidate to protect PBO against light degradation. Accordingly, for UV protection of fabrics, CN105088793 proposes mixing zinc oxide with the oxidized graphene. CN106087396 proposes graphene oxide slurries baked onto a polysulfonamide fabric for good mechanical properties and good anti UV performance. For Aramid fibers UV resistance has been obtained by dopamine modification of the fiber in combination with graphene coating.

DESCRIPTION/SUMMARY OF THE INVENTION

It is therefore an objective of the invention to provide an improvement in the art. Especially, it is an objective to improve light resistivity of PBO fibers. More particularly, it is an objective to provide a hull material for a high altitude airship. This objective is achieved by a method and product as set forth in the following.

The inventors have found that a simple coating of graphene oxide, GO, on PBO did not protect the PBO sufficiently or satisfactory against light and UV and Ozone degradation. Closer study revealed not only an uneven surface coating but also openings in the coating through which light could penetrate to the fiber and degrade it. Furthermore, it appeared that the mere coating with GO did not provide sufficient light protection. When having the above-mentioned CN102173145B in mind about good transparency despite GO coating, this is not a surprise. However, the inventors found that a pronounced cross linking of the GO with complex molecules prior or during the coating of the PBO increased protection against light and UV degradation.

Surprisingly, a method developed for 3D structures of GO appeared to be well suited for such cross linking as well as coating procedure. A method for 3D coating of GO is disclosed in the article "Covalently Interconnected Three-Dimensional Graphene Oxide Solids", published by Sudeep et al. (one of the inventors) in ACS Nano Vol. 7 No. 8, 7034-7040, 2013, and which is incorporated herein by reference. The article is available on the Internet at http://pubs.acs.org/doi/ipdf/10.1021/nn402272u.

By cross-linking graphene oxide, GO, with a cluster of glutaraldehyde, GAD, and resorcinol, Res, a three dimensional structure was created on the PBO surface. The resulting coating had a proper attachment to the otherwise inert PBO surface and had an even thickness of dimensions sufficiently thick to protect the PBO against degradation.

It is pointed out that the use of glutaraldehyde instead of formaldehyde has an advantage of better performance. In addition, the toxicity of formaldehyde makes the substance unattractive, as typical production facilities would not accept the use of such toxic material.

It has been found that a dry environment for the coating results in better attachment and stability. It is believed that the GO has a tendency to incorporate moisture in the coating or on the fiber surface, which results in lower quality of the coating. This was a surprising finding, seeing that moisture tend to improve the GO stability. The dry production environment is also useful for the PBO material itself, as it is sensitive to moisture. The influence of moisture on the PBO is also a factor that needs attention not only to the production facilities but also for the coated material when being used for an airship, as the airship, as long as it is not in the stratosphere, is exposed to humidity in the atmosphere. For example, the humidity in the environment during the coating is less than 2 grams of water vapour in 1 kg of air, for example less than 1 g/kg or even less than 0.5 g/kg. It is compared to the stratosphere, in which the air typically contains 0.3 g water vapour per kg of air.

The above objective is achieved with methods and products as set forth in the following.

A method for producing a PBO fiber with increased resistance against UV and Ozone-caused degradation, the method comprising providing a coating on the PBO fibers, the coating comprising graphene oxide cross-linked by polymerization with glutaraldehyde and resorcinol.

A method for reducing the light degradation of PBO fibers wherein a coating is applied to the PBO fibers, the coating comprising graphene oxide cross-linked by polymerization with glutaraldehyde and resorcinol.

A PBO fiber coated with graphene-oxide cross-linked with glutaraldehyde and resorcinol.

A laminate material comprising a reinforcing fiber layer, the reinforcing fiber layer comprising PBO fibers coated with graphene-oxide cross-linked with glutaraldehyde and resorcinol.

An airship hull comprising a fiber layer, the fiber layer comprising PBO fibers coated with graphene-oxide that is cross-linked with glutaraldehyde and resorcinol.

A lighter-than-air vehicle comprising a hull, the hull comprising a laminate material as a gas barrier and load-bearing structure, the laminate material comprising a reinforcing fiber layer, the reinforcing fiber layer comprising PBO fibers coated with graphene-oxide cross-linked with glutaraldehyde and resorcinol.

Use of PBO fibers coated with graphene-oxide cross-linked with glutaraldehyde and resorcinol for reducing degradation of PBO fibers caused by exposure to light, UV or Ozone radiation or chemical reactions.

SHORT DESCRIPTION OF THE DRAWINGS

The invention will be explained in more detail with reference to the drawing, where FIG. 1 illustrates Res-GAD cross linking of GO and the modification of PBO fibers;

DETAILED DESCRIPTION/PREFERRED EMBODIMENT

Figure 1:
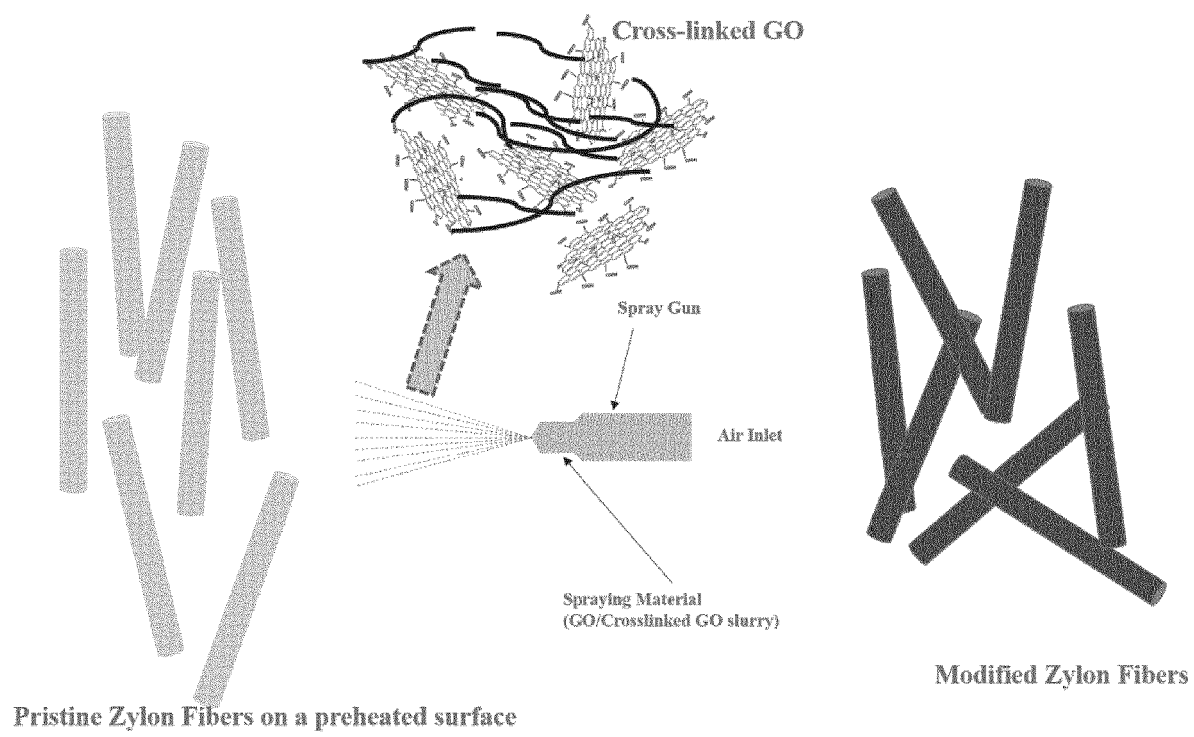

FIG. 1 illustrates a cross-linking of graphene oxide, GO, with a cluster of glutaraldehyde, GAD, and resorcinol, Res. The cross linking creates a three dimensional structure prior or during the coating process of the coating process onto the PBO fibers.

The synthesis of GO and cross-linked GO was performed similarly as described in the article "Covalently Interconnected Three-Dimensional Graphene Oxide Solids", published by one of the inventors Sudeep et al. in ACS Nano Vol. 7 No. 8, 7034-7040, 2013, available on the Internet at http://pubs.acs.org/doi/ipdf/10.1021/nn402272u.

Synthesis of GO. Graphene oxide was synthesized as follows. A 9:1 mixture of concentrated $H_2SO_4/H_3PO_4$ (360:40 mL) was added to a mixture of graphite flakes (3.0 g, 1 wt equiv) and $KMnO_4$ (18.0 g, 6 wt equiv). The reactants were then heated to 50° C. and stirred for 12 h. The reaction was cooled to room temperature and poured onto ice with 30% $H_2O_2$ (3 mL). The material was then washed in succession with 200 mL of water, 200 mL of 30% HCl, and 200 mL of ethanol (2 times). The material remaining after this multiple-wash process was coagulated with 200 mL of ether, and the resulting suspension was filtered over a PTFE membrane with a 0.22 μm pore size.

Cross linking of GO. Dry GO was dispersed in deionized water (5 mg/mL) and treated with resorcinol (11 mM), and glutaraldehyde solution (22 mM). The resulting viscous fluid-like material and the solution were sonicated for 3 h.

For the PBO fibers used in the experiments, Zylon® multifilaments were purchased and single filaments removed therefrom for the coating. The diameter of such filaments was 12 μm.

In first experiments, the material was coated into the PBO single filaments by dipping the filaments into the solution and then drying the filaments. For large scale production, spray coating appears as a more feasible method.

For the UV irradiation, an apparatus was used from the company Dinies, see http://shop.dinies.com/product_info.php?info=p96_uv-chamber-m1.html, namely UV chamber M1, equipped with a UVA irradiation source providing 365 nm UVA light onto en irradiation are of 195×190 mm. The intensity of the 365 nm UVA radiation at the location of the fiber was 1900 W/m2.

Figure 2:
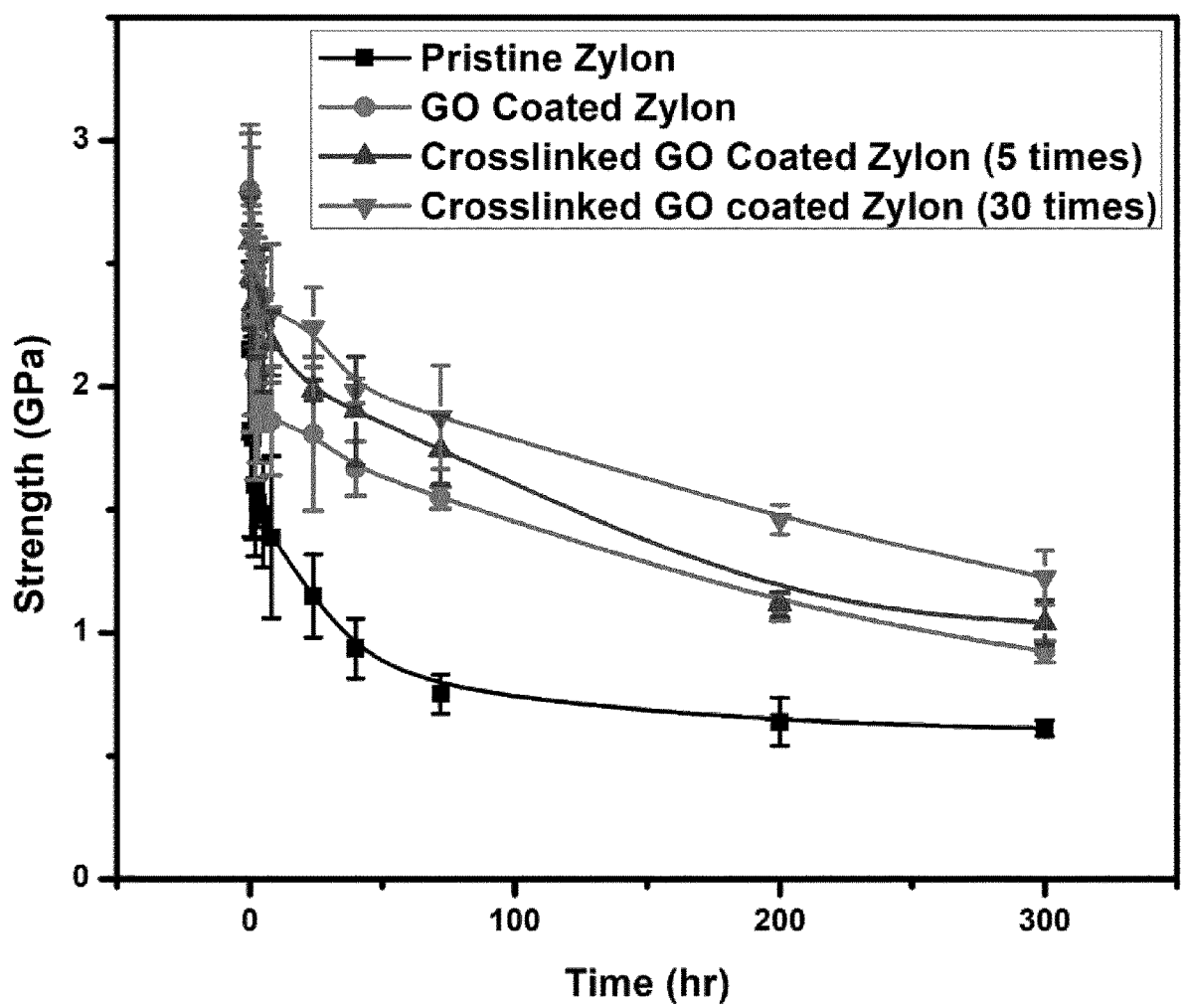
FIG. 2 illustrates the strength measurements of Zylon® single filaments for various PBO fiber coatings in dependence of the time for UV exposure.

FIG. 2 illustrates the strength measurements for various PBO coatings in dependence of the time for UV exposure.

Four states of the PBO single filaments were used for the experiments. The lowest curve of the four curves relates to pristine (uncoated) PBO fibers. The measured data were compared to similar data from the company Toyobo, and agreement was found between the data, which proves that the results are reliable.

A coating with the cross-linked GO improved the UV resistance of the PBO fibers substantially. An even further improvement could be achieved by 5 and 30 times repeated coating. The improvement by the repeated coating is not only due to a thicker coating layer but also due to covering of defects in one layer by a subsequent layer, resulting in a more homogeneous coating and, thus, a better protection.

The exposure of the coated PBO fibers was about 100 times longer before the same reduction in strength was achieved as for the pristine PBO fibers. And after 300 hours of exposure, the coated PBO fibers had a strength about twice that of the pristine fibers.

Figure 3:
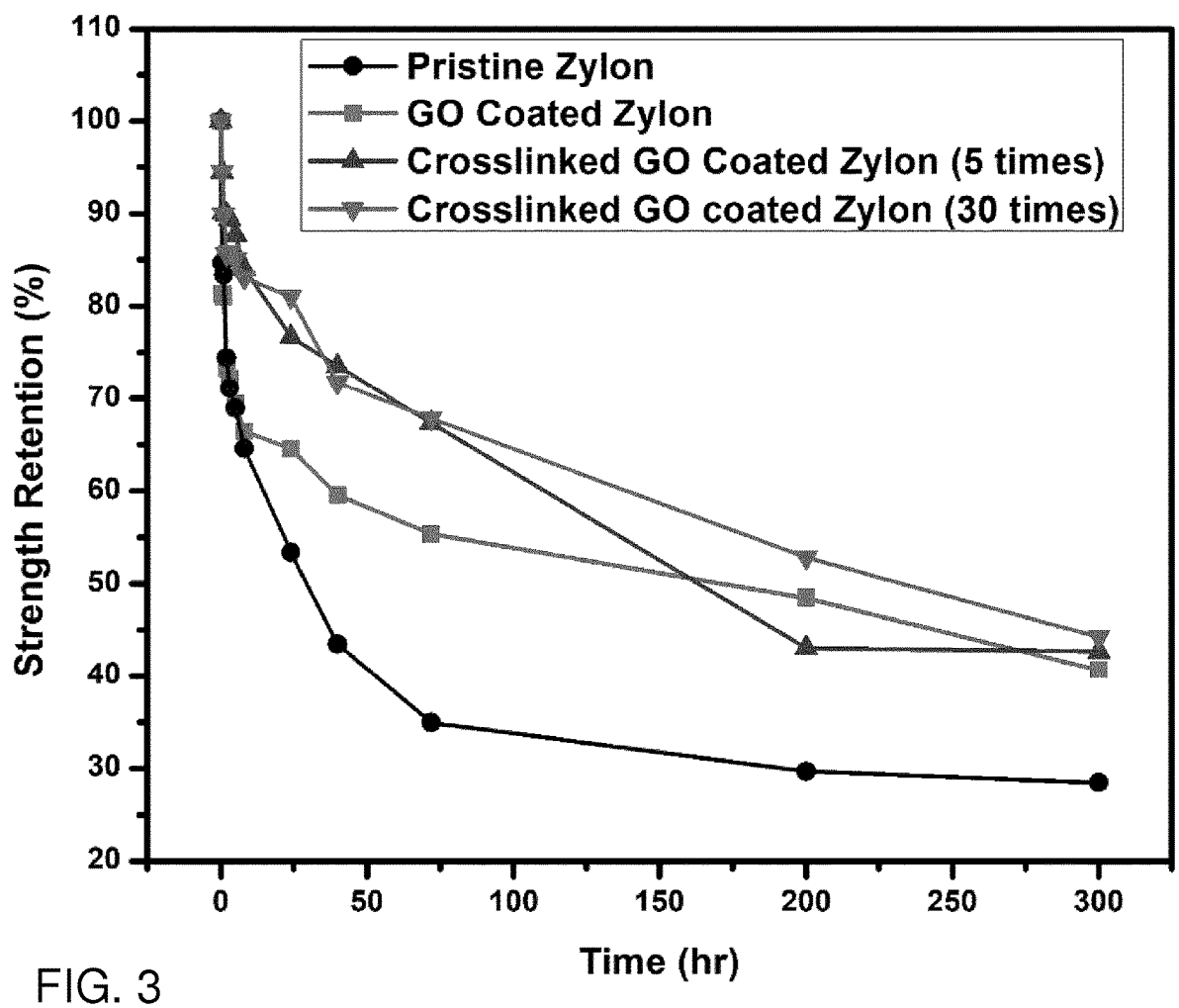
FIG. 3 illustrates the strength retention in Zylon® single filaments in percentage for various PBO fiber coatings in dependence of the time for UV exposure.

FIG. 3 illustrates the strength retention in percentage of the various fiber states in dependence of the time for UV exposure. It is observed that the strength retention was highest for the PBO single filaments coated with cross-linked GO. Multiple coatings had a more pronounced effect than single coating.

Figure 4:
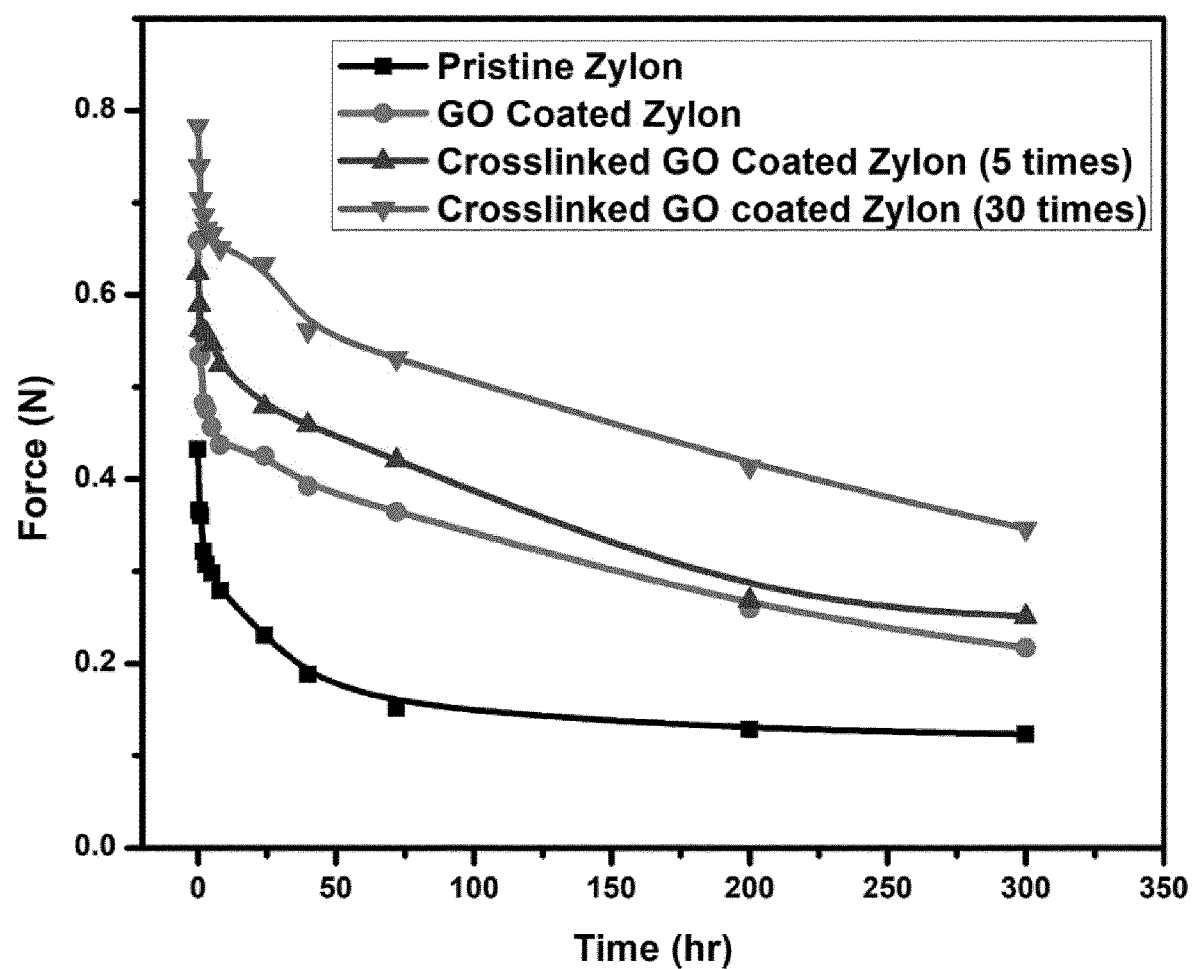
FIG. 4 illustrates experimental values for the resistance force in Newton for the measured PBO Zylon® single filaments in dependence of the time for UV exposure.

FIG. 4 illustrates the force in Newton that had to be applied until breakage. For the PBO single filaments coated with cross-linked GO the force was 2 to 3 times as high, dependent on the number of coatings.

Figure 5:
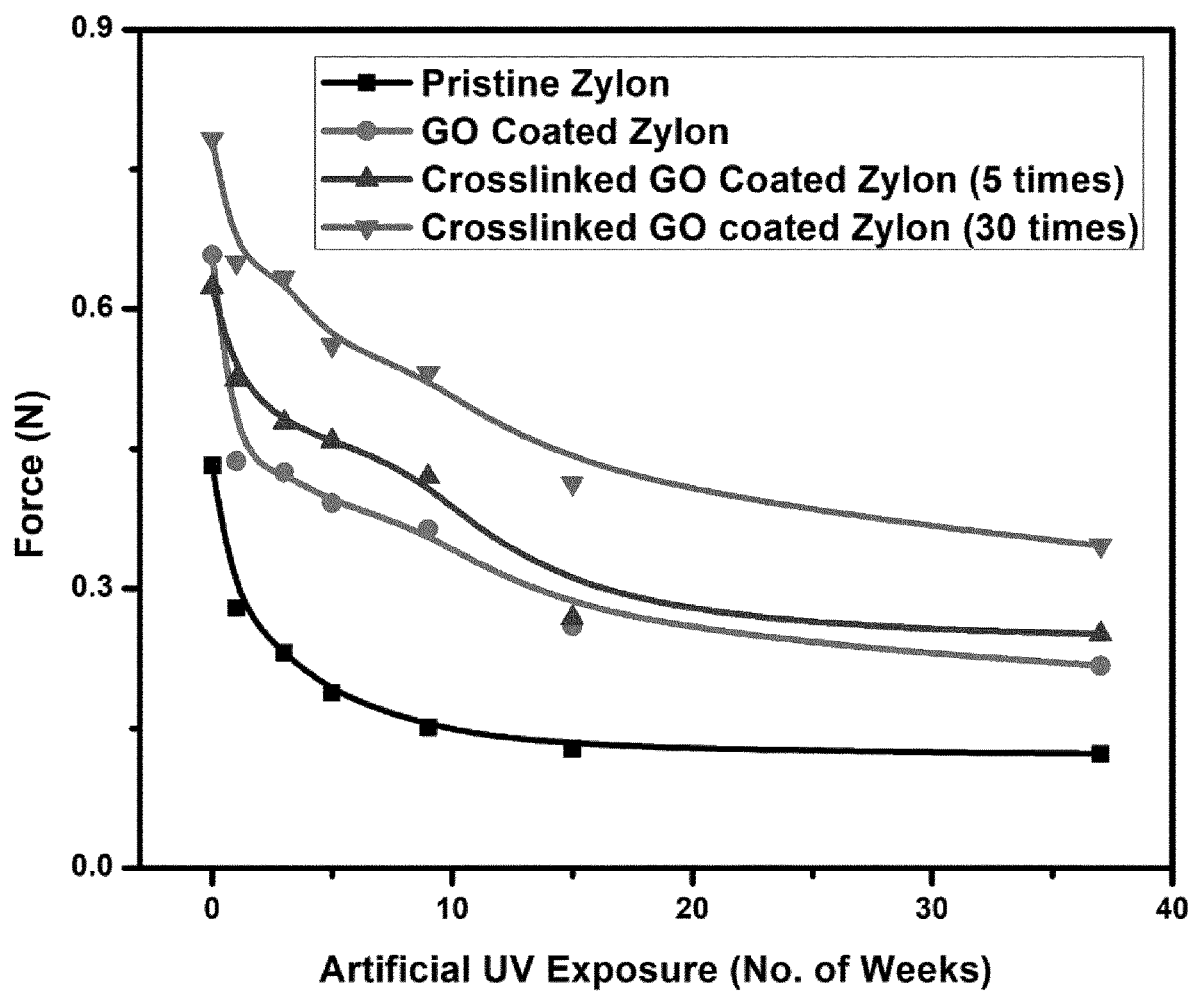
FIG. 5 illustrates experimental values of FIG. 4, where the high intensity exposure time has been translated into estimated time of UV exposure in the stratosphere.

FIG. 5 illustrates the experimental values on a time line, in which the exposure time in hours is converted into estimated exposure times as expected in the stratosphere. Largely, 10 hours of exposure with the lamp correspond to one week of exposure in the stratosphere. It is observed that the 30 layer coating retains stability after 33 weeks for the single filament such that it can withstand about one third of the force relatively to its production state and more than three times better than for pristine PBO.

Figure 6:
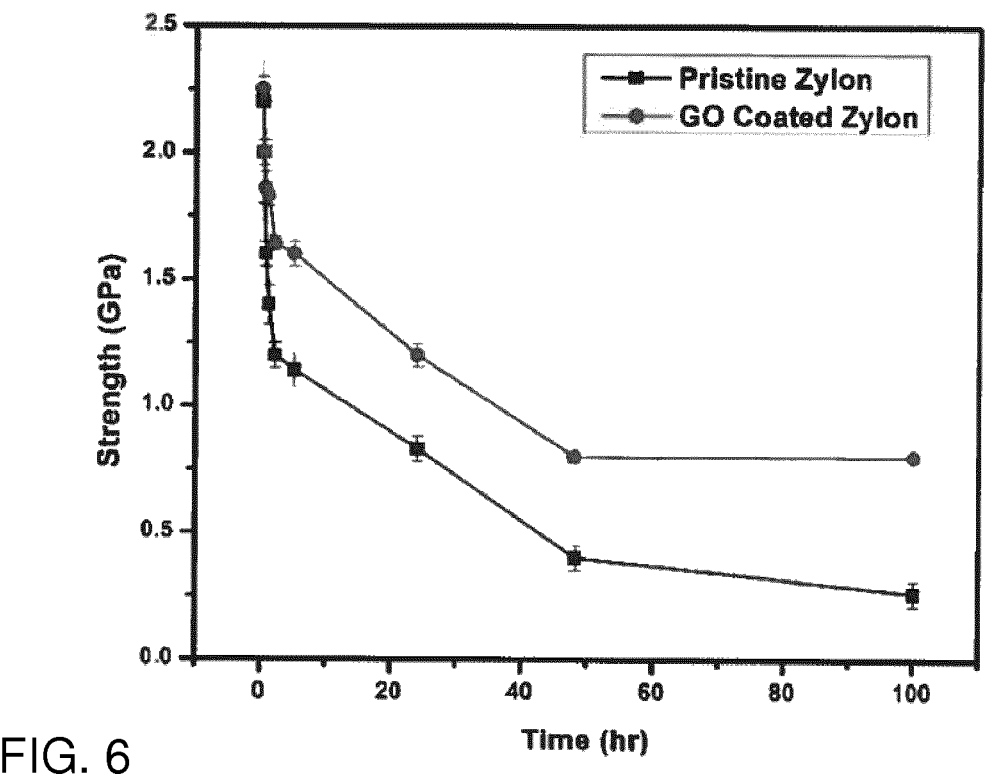
FIG. 6 illustrates the strength of PBO Zylon® single filaments in dependence of the time of Ozone exposure

FIG. 6 illustrates the strength measurements for various PBO coatings in dependence of the time for Ozone exposure. The concentration of Ozone during the exposure was 18 ppm. This study shows that the Ozone exposure has significant effect on the strength degradation of PBO single filaments. The modified single filaments coated with cross-linked GO had an enhanced shielding effect that resulted in a three times higher strength after 100 hours of ozone exposure as compared to pristine PBO single filaments.

Figure 7:
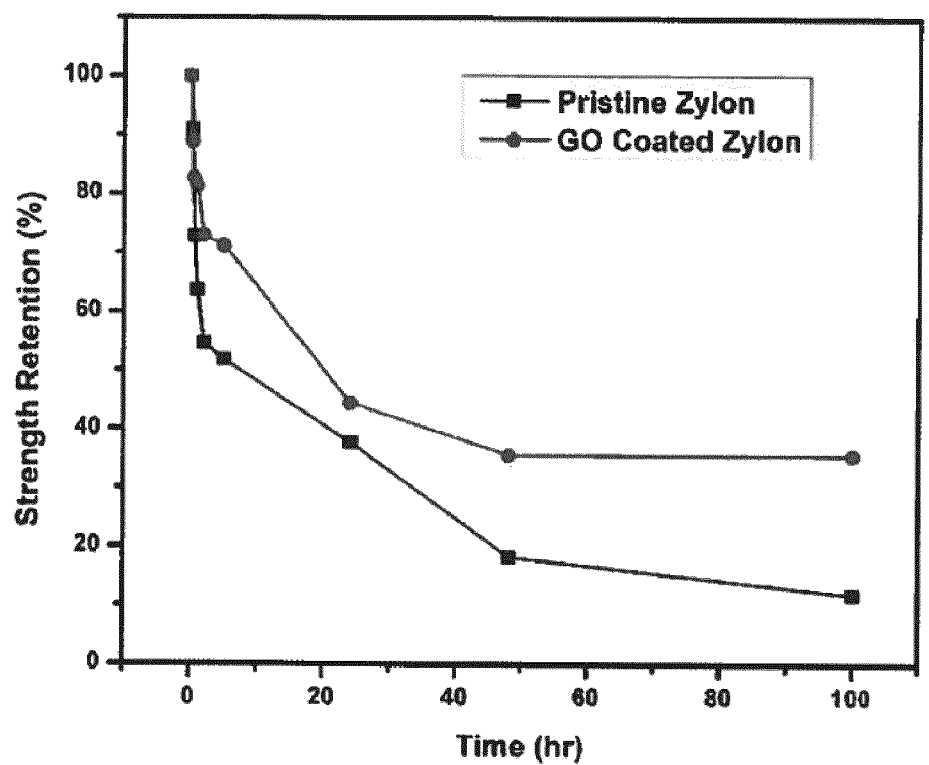
FIG. 7 illustrates the strength retention in percentage for PBO Zylon® single filaments in dependence of the time of Ozone exposure.

FIG. 7 illustrates the strength retention in percentage of pristine and cross-linked GO coated single filaments when exposed to 18 ppm ozone. It illustrates that PBO single filaments that were coated with cross-linked GO had a three times higher strength retention after 100 hours exposure to ozone.

The experiments on dingle filaments were made for having a well-defined and smooth surface. However, it is believed that the results for coated PBO multifilaments, such as Zylon® multifilaments fibers, would be even better because the coating would stick better to the surface, which is less smooth. Further, a potential weakness of one of the filaments at one position could be compensated by the strength of the others at that position so that the risk for rupture of a weakened filament is lower in a bundle of filaments than for single filaments as in the experiments.

The invention claimed is:

1. A method for producing a PBO fiber with increased resistance against UV-caused degradation, the method comprising providing a coating on the PBO fibers, the coating comprising graphene oxide cross-linked by polymerization with glutaraldehyde and resorcinol.

2. The method of claim 1, wherein the coating comprises graphene oxide dispersed in deionized water and treated with resorcinol and glutaraldehyde with a mM-ratio of 1:2.

3. The method of claim 2, wherein the coating comprises graphene oxide dispersed in deionized water and treated with a solution containing 11 mM resorcinol and 22 mM glutaraldehyde.

4. A PBO fiber coated with graphene-oxide cross-linked with glutaraldehyde and resorcinol.

5. A laminate material comprising a reinforcing fiber layer, the reinforcing fiber layer comprising PBO fibers coated with graphene-oxide cross-linked with glutaraldehyde and resorcinol.

6. An airship hull comprising a fiber layer, the fiber layer comprising PBO fibers coated with graphene-oxide that is cross-linked with glutaraldehyde and resorcinol.

7. A lighter-than-air vehicle comprising a hull, the hull comprising a laminate material as a gas barrier and load-bearing structure, the laminate material comprising a reinforcing fiber layer, the reinforcing fiber layer comprising PBO fibers coated with graphene-oxide cross-linked with glutaraldehyde and resorcinol.

* * * * *